J. M. VAN HOUTEN.
SHINGLE MOLD.
APPLICATION FILED APR. 2, 1920.
1,416,079.
Patented May 16, 1922.
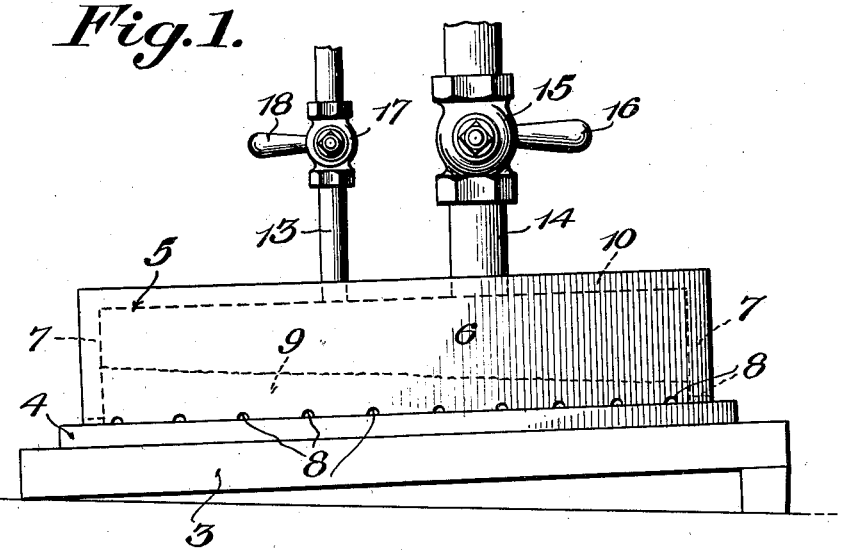
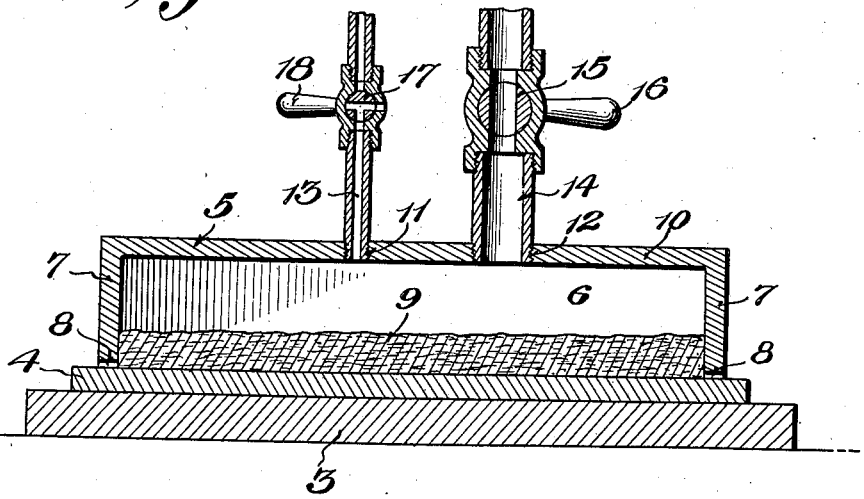
Inventor
John M. Van Houten

UNITED STATES PATENT OFFICE.

JOHN M. VAN HOUTEN, OF BEACON, NEW YORK.

SHINGLE MOLD.

1,416,079.  Specification of Letters Patent.  Patented May 16, 1922.

Application filed April 2, 1920. Serial No. 370,796.

*To all whom it may concern:*

Be it known that I, JOHN M. VAN HOUTEN, a citizen of the United States, residing at Beacon, in the county of Dutchess and State of New York, have invented certain new and useful Improvements in Shingle Molds; and I do hereby declare the following to be a full, clear, and exact description of the same, reference being had to the accompanying drawings, forming part of this specification.

The object of this invention is to provide an apparatus in which a composition shingle may be molded directly on a thin removable plate on which it remains until it sets or hardens sufficiently to be handled, thereby avoiding the use of fabric or felt.

Another object of the invention is to provide an apparatus in which plastic material may be readily admitted to the molding dome in a condition in which it quickly takes the desired shape and the water and moisture quickly and uniformly driven from the plastic mass by means of a compressed fluid, such as air, inert gas or steam.

A further object of the invention is to provide an apparatus in which either level or taper slabs of artificial stone may be readily and cheaply formed of a mixture of fibrous material and hydraulic cement in a plastic condition.

The apparatus for achieving the objects set forth in its preferred form is illustrated in the drawing accompanying this specification and forming a part thereof, in which—

Fig. 1 is an end view of the device tilted so as to form tapered shingles.

Fig. 2 is a central longitudinal section through the device, the latter being level.

In the preferred embodiment of my invention 3 represents the flat platform or base upon which rests the thin removable plate 4 which forms a bottom for the molding dome 5. The base is generally horizontal, but may be tilted when it is desired to cast tapering slabs. The method of tilting the base forms no part of my invention and is therefore illustrated in a simple unadjustable type.

The mold is of any desired shape in plan, being fashioned to conform to the shape of shingle desired, the illustrated form being for the manufacture of rectangular prisms of uniform thickness, and therefore having flat sides 6 and ends 7 each being provided with a plurality of grooves 8 in their bottom edges forming outlets for the water forced from the plastic mass 9. The top 10 of the mold may be dome-shaped, as is usual in constructions of this character, or may be flat as illustrated, and is provided with two orifices 11 and 12 in which are secured pipes 13 and 14 being respectively the air and material inlets. The material inlet pipe is provided with a valve 15 operated by a handle 16 and the air pipe is likewise provided with a valve 17 and operating handle 18.

The plastic mass composed of the usual ingredients, for example, a mixture of fibrous materials and hydraulic cement, is mixed in the usual way except that in my improvement a considerably greater percentage of water may be used, thereby avoiding the waste of time incidental to uniformly distributing a stiff mass in the shaping mold. The desired amount of the semi-fluid mixture prepared as indicated is introduced into the molding dome through the inlet 14 and by virtue of its lack of stiffness at once takes up the desired form in the mold. The valve 15 is then closed and compressed air, gas or steam is admitted through the inlet 13, thereby forcing the water or moisture down through the plastic mass and out the orifices 8 which it will be noted are at the extreme bottom of the slab 19 and on a level with the top of the removable plate 4. The water outlets 8 may be of any desired shape and number, the only requirement being that the space between the dome and the plate be just sufficient to permit the ready passing out of the water, leaving the fibrous material and cement in the mold.

As soon as the water is forced out the dome is raised and the plate and the still soft slab are removed and laid aside until the block of artificial stone is hardened or "set" sufficiently to be handled alone. It will be understood that a plurality of plates are to be used with each dome, thereby avoiding the additional labor and equipment needed where the slab rests on felt and the mold has to be inverted to remove the shingle.

What is claimed is:

1. A bottomless molding dome, having an air inlet, a material inlet, and a plurality of water outlets adjacent to the open bottom.

2. An open bottom molding dome having a plurality of small grooves at the lower end and a plurality of inlet openings at the upper end.

3. A molding dome adapted to seat upon a plane surface, and characterized by the provision of a plurality of water discharging grooves in the portion engaging said plane surface.

4. A molding dome adapted to seat upon a plane surface, and characterized by the provision of a plurality of water discharging grooves in the portion engaging said plane surface said dome having a material passage and an air passage, and means for closing one or both of said passages at will.

5. The process of making composition shingles and the like which consists in delivering to a pressure chamber having an imperforate detachable bottom a fluid mixture of fibrous material, hydraulic cement and water, then admitting air or like fluid under pressure to the chamber to press the water out between the chamber and said imperforate bottom, then removing said bottom and the so-formed shingle before the latter has entirely "set."

JOHN M. VAN HOUTEN.